US008593786B2

(12) United States Patent
Feichtinger et al.

(10) Patent No.: US 8,593,786 B2
(45) Date of Patent: Nov. 26, 2013

(54) ELECTRICAL MULTILAYER COMPONENT AND CIRCUIT ARRANGEMENT

(75) Inventors: Thomas Feichtinger, Graz (AT); Georg Krenn, Graz (AT)

(73) Assignee: EPCOS AG, Munich (DE)

( * ) Notice: Subject to any disclaimer, the term of this patent is extended or adjusted under 35 U.S.C. 154(b) by 85 days.

(21) Appl. No.: 13/395,986

(22) PCT Filed: Oct. 11, 2010

(86) PCT No.: PCT/EP2010/065216
§ 371 (c)(1),
(2), (4) Date: Mar. 14, 2012

(87) PCT Pub. No.: WO2011/045281
PCT Pub. Date: Apr. 21, 2011

(65) Prior Publication Data
US 2012/0188685 A1 Jul. 26, 2012

(30) Foreign Application Priority Data
Oct. 12, 2009 (DE) .......................... 10 2009 049 077

(51) Int. Cl.
*H01G 4/06* (2006.01)
(52) U.S. Cl.
USPC .................. 361/321.2; 361/321.1; 361/306.1; 361/306.3; 361/303; 361/301.4
(58) Field of Classification Search
USPC ........... 361/321.2, 321.1, 303–305, 311–313, 361/306.1–306.3, 301.2, 301.4
See application file for complete search history.

(56) References Cited

U.S. PATENT DOCUMENTS

| 5,170,317 | A | 12/1992 | Yamada et al. |
| 6,115,234 | A | 9/2000 | Ishii et al. |
| 6,191,932 | B1 * | 2/2001 | Kuroda et al. ................. 361/303 |
| 6,282,079 | B1 * | 8/2001 | Nagakari et al. .............. 361/303 |
| 6,727,782 | B2 * | 4/2004 | Sasaki et al. ................... 333/185 |
| 6,768,630 | B2 * | 7/2004 | Togashi ..................... 361/306.1 |
| 7,230,815 | B2 * | 6/2007 | Yoon et al. .................... 361/303 |
| 7,420,796 | B2 * | 9/2008 | Ota ............................ 361/321.2 |
| 7,948,737 | B2 * | 5/2011 | Togashi et al. ............. 361/306.3 |
| 7,990,677 | B2 * | 8/2011 | Lee et al. .................... 361/306.3 |
| 2006/0104002 | A1 | 5/2006 | Engel et al. |
| 2008/0186127 | A1 | 8/2008 | Feichtinger et al. |
| 2010/0109804 | A1 | 5/2010 | Feichtinger |

FOREIGN PATENT DOCUMENTS

| DE | 7301330 U | 8/1973 |
| DE | 102 24 565 A1 | 12/2003 |
| DE | 102 24 566 A1 | 12/2003 |
| DE | 102 41 674 A1 | 3/2004 |
| DE | 103 56 498 A1 | 7/2005 |
| DE | 10 2004 058 410 A1 | 6/2006 |

(Continued)

*Primary Examiner* — Nguyen T Ha
(74) *Attorney, Agent, or Firm* — Slater & Matsil, L.L.P.

(57) ABSTRACT

An electrical multilayer component has a monolithic main body that includes a number of alternating ceramic layers disposed one above the other and at least one electrode layer. The main body has two end faces opposite each other and two lateral faces opposite each other. The component also includes a number of outer electrodes and at least three inner electrodes. Each of the inner electrodes is associated with one outer electrode. A first inner electrode protruding from an end face and a second inner electrode protruding from an opposite end face have a first distance to each other. A third inner electrode protrudes from a side face.

20 Claims, 15 Drawing Sheets

(56) References Cited

FOREIGN PATENT DOCUMENTS

| DE | 10 2007 020 783 A1 | 11/2008 |
|----|--------------------|---------|
| JP | 01-316919 A | 12/1989 |
| JP | 2000-195742 A | 7/2000 |
| JP | 2005-142587 A | 6/2005 |

* cited by examiner

ELECTRICAL MULTILAYER COMPONENT AND CIRCUIT ARRANGEMENT

This patent application is a national phase filing under section 371 of PCT/EP2010/065216, filed Oct. 11, 2010, which claims the priority of German patent application 10 2009 049 077.9, filed Oct. 12, 2009, each of which is incorporated herein by reference in its entirety.

BACKGROUND

An electrical multilayer component is known from German patent document DE 10 2007 020783 A1.

SUMMARY OF THE INVENTION

In one aspect, the invention specifies an electrical multilayer component that can be produced in a simple manner and that has a high integration density. Furthermore, embodiments of the intention specify a circuit arrangement comprising the electrical multilayer component.

An electrical multilayer component comprises a monolithic base body is specified, comprising a plurality of ceramic layers and electrode layers arranged alternately one above another. The base body has two end surfaces lying opposite one another and two side surfaces lying opposite one another. The electrical multilayer component has a plurality of external electrodes. The electrical multilayer component has at least three internal electrodes. Each of the internal electrodes is assigned to a respective external electrode. A first internal electrode proceeding from an end surface of the base body and at least one second internal electrode proceeding from an opposite end surface are at a first distance from one another. A third internal electrode proceeds from a side surface of the base body, the third internal electrode being at a second distance at least from the first internal electrode and from the second internal electrode.

In one embodiment of the electrical multilayer component, at least two of the internal electrodes are formed in at least one common electrode layer.

In one embodiment of the electrical multilayer component, the first and the second internal electrode at least partly overlap. In one embodiment of the electrical multilayer component, the third internal electrode at least partly overlaps the first or the second internal electrode.

In one embodiment of the multilayer component, the electrode area of the first internal electrode is larger than the electrode area of the second internal electrode. In a further embodiment, the first and second internal electrodes each have an electrode area having the same size.

Preferably, the regions of the first and of the second distance each comprise at least one ceramic layer.

The first and second internal electrodes together with the partial region of at least one ceramic layer which lies between the first and second internal electrodes form a first electrical functional unit.

In one embodiment of the multilayer component, the third internal electrode in the boundary region with one of the first and/or one of the second internal electrodes via the respective partial region of one or a plurality of ceramic layers that lies therebetween forms a second electrical functional unit.

In one embodiment of the electrical multilayer component, a fourth internal electrode proceeds from a side surface of the base body, the fourth internal electrode being spaced apart by a third distance from at least one of the first and/or the second internal electrode and delimiting, together with a partial region of a ceramic layer between the fourth internal electrode and at least one of the first and/or the second internal electrode, a third electrical functional unit.

The functional units of the electrical multilayer component are independent of one another without taking account of edge effects. The term edge effects denotes, for example, electrical couplings which could occur between two third or fourth internal electrodes arranged alongside one another.

In one embodiment, the third and the fourth internal electrode are arranged in the same electrode layer, wherein the third and the fourth internal electrode are either arranged in the same layer as the first and the second internal electrode or arranged with one of the first or second internal electrodes or in a different layer.

The third and the fourth internal electrode are preferably arranged such that they have no edge effects among one another. In one embodiment, the third and the fourth internal electrodes are arranged in the same electrode layer and spaced apart from one another to such an extent that preferably no edge effects occur between the third and the fourth internal electrodes, such that at least approximately no electrical functional unit is formed between the third and the fourth internal electrodes.

In one embodiment, the first and second internal electrodes are respectively connected to an external electrode, which are arranged on the opposite end surfaces of the base body.

In a further embodiment, the electrical multilayer component preferably has a symmetrical arrangement of internal electrodes along a longitudinal axis of the base body.

In one embodiment, an electrical functional unit of the multilayer component has the function of a capacitor or a varistor.

In a further embodiment, both a capacitor and a varistor or a plurality of varistors or a plurality of capacitors are arranged in an electrical multilayer component.

In another embodiment, the electrical multilayer component has a plurality of capacitors, wherein the capacitance of the first electrical functional unit, which is delimited by the first and second internal electrodes arranged on an end side, differs from the capacitances of the further electrical functional units by a factor of 1000.

In one embodiment of the electrical multilayer component, the first electrical functional unit, which is delimited by the first and second internal electrodes contact-connected on an end side, has a capacitance that is preferably less than one picofarad (pF).

In one embodiment, the electrical multilayer component has a plurality of capacitors having different capacitances.

In a further embodiment, the multilayer component has a plurality of varistors having different varistor voltages. However, it is also possible for the electrical multilayer component to have a plurality of capacitors and varistors having in each case different capacitances and different varistor voltages, respectively.

In one embodiment of the multilayer component, one of the ceramic layers comprises a varistor ceramic and/or a capacitor ceramic. The varistor ceramic of the electrical multilayer component, the varistor ceramic forming the ceramic layer, preferably comprises zinc oxide, bismuth antimony or zinc oxide praseodymium.

In one embodiment of the electrical multilayer component, the base body comprises at least one dielectric layer which has a low permittivity. In one embodiment, two dielectric layers delimit the multilayer component in the thickness direction toward the top and bottom.

In a further embodiment of the electrical multilayer component, at least one dielectric layer is arranged as an intermediate layer between two mutually independent parts of the multilayer component. The dielectric layer preferably comprises a glass or a zirconium oxide, a glass-zirconium oxide composite, an aluminum oxide or a glass-aluminum oxide composite.

The region of the first distance between the first and second internal electrodes, and of the second distance between a third internal electrode and the first or second electrode, and of the third distance between a fourth electrode and the first or second electrode preferably comprises a ceramic layer or a part of a ceramic layer.

In one embodiment of the electrical multilayer component, the contact-connection is effected by means of land grid arrays (LGA) or ball grid arrays (BGA). In this case, the layer construction of the electrical multilayer component is preferably effected perpendicularly to the layer of the connection contacts. In one embodiment, the electrode areas of the first and/or of the second internal electrode can be contact-connected via external electrodes from the side of the multilayer component. The third and fourth internal electrodes can be contact-connected via LGA or BGA contacts on the underside of the base body. In a further embodiment, the contact-connection of the first and/or second internal electrode is effected in the form of a BGA or LGA contact-connection on the underside of the base body.

For interconnecting an electrical multilayer component described above in a circuit arrangement, at least one first external electrode from among the external electrodes arranged at the end sides is connected to ground. At least one second external electrode from among the external electrodes arranged at the end sides is connected to a voltage-carrying line. The further external electrodes arranged at the side surfaces of the electrical multilayer component are preferably connected externally, for example, to signal lines.

A multilayer component of this type makes it possible to achieve a high degree of integration of the construction, wherein functional units such as capacitors having different capacitances can be realized in one component. By way of example, it is thus possible to realize a component in which the capacitances differ by a factor of 1000, that is to say, e.g., 0.1 pF (pF=picofarad) and 100 pF. The first electrical functional unit of the multilayer component preferably has the function of a capacitor, wherein the capacitance thereof is preferably less than 1 pF.

BRIEF DESCRIPTION OF THE DRAWINGS

The above-described subjects and the arrangement are explained in greater detail with reference to the following figures and exemplary embodiments.

The drawings described below should not be regarded as true to scale. Elements which are of the same type or which perform the same function have the same reference symbols.

The following list of reference symbols may be used in conjunction with the drawings:
1 Base body
2 Ceramic layer
3 Electrode layer
4, 4' End surface
5, 5' Side surface
6, 6' External electrode
7, 7' First internal electrode, proceeding from an end side
8, 8' Second internal electrode, proceeding from an end side
9, 9' Third internal electrode, proceeding from a side surface
10, 10' Fourth internal electrode, proceeding from a side surface
11 First electrical functional unit
12 Second electrical functional unit
13 Third electrical functional unit
14 Varistor
15 Voltage-carrying line
GND Ground connection
a First distance
b Second distance
c Third distance
18 Dielectric layer 19, 19' Contact area
20, 20' Soldering bead
21 First internal electrode
22 Second internal electrode
A, A' Sectional axis
B, B' Sectional axis Detailed Description of Illustrative Embodiments FIG. 1 schematically shows the arrangement of external electrodes 6, 6' at a base body 1 of an electrical multilayer component composed of ceramic layers and an electrode layer arranged one above another. FIG. 1 shows an embodiment of the electrical multilayer component comprising four external electrodes 6, 6', wherein a respective external electrode 6 is arranged at the end sides 4, 4' of the base body 1. A respective further external electrode 6' is arranged at the two opposite side surfaces 5, 5' of the base body 1. The embodiments of the electrical multilayer component according to FIGS. 2 to 11 preferably have an arrangement of the external electrodes according to FIG. 1. Depending on the embodiment of the internal electrode arrangement it is possible for individual external electrodes not to be contact-connected and to be present as dummy contacts.

FIG. 2a shows a schematic construction of the internal electrode arrangement of an electrical multilayer component composed of ceramic layers and an electrode layer arranged one above another which form a base body 1. The electrode layer has a first internal electrode 7 and a second internal electrode 8, wherein the first 7 and the second 8 internal electrode are arranged in such a way that they are spaced apart from one another laterally by means of a first distance a (shown in FIG. 2b). The electrical multilayer component has a third internal electrode 9, which is spaced apart laterally from the second internal electrode 8 by means of a second distance b (shown in FIG. 2c). The first internal electrode 7, the second internal electrode 8 and the third internal electrode 9 are arranged in a layer of the electrical multilayer component.

FIG. 2b shows a section through the electrode layer along the sectional axis A, A'. The electrical multilayer component has a base body 1. The electrical multilayer component has a plurality of ceramic layers 2 (not illustrated) and the layer 3, in which the internal electrodes are situated.

FIG. 2c shows a cross section through the electrical multilayer component along the sectional axis B, B'. The second internal electrode 8 and the third internal electrode 9 are arranged in the same electrode layer 3 of the electrical multilayer component and are spaced apart from one another by means of the second distance b.

FIG. 3a shows a schematic construction of the internal electrodes of a further embodiment of the electrical multilayer component composed of ceramic layers and an electrode layer arranged one above another. A first 7 and a second 8 internal electrode are arranged in the same layer of the base body 1 of the electrical multilayer component in a manner spaced apart from one another by a first distance a. The electrical multilayer component has a third electrode 9, which is spaced apart from the second electrode 8 by means of a second distance b. The electrical multilayer component has a fourth internal electrode 10, which is spaced apart from the second internal electrode 8 by means of a third distance c. The internal electrodes 7 to 10 of the electrical multilayer component are arranged in the same layer. In the region of the first distance a, the first internal electrode 7 together with the second internal electrode 8 and that partial region of the ceramic layers which is arranged in the region of the first distance a forms a first electrical functional unit 11. In the region between the third internal electrode 9 and the second internal electrode 8, which are spaced apart from one another by a second distance b, the second 8 and the third 9 internal electrode together with the partial region of the ceramic layers form a second electrical functional unit 12. In the region between the second internal electrode 8 and the fourth internal electrode 10, the two internal electrodes together with that partial region of the ceramic layers which is arranged in the third distance c form a third electrical functional unit 13.

FIG. 3b shows a section through the component along the sectional axis B, B'. The electrical multilayer component exhibits in cross section the second internal electrode 8, which together with the third internal electrode 9 and the fourth internal electrode 10 are arranged in the same layer of the base body 1.

FIG. 4a shows a schematic construction of the internal electrodes of a further embodiment of the electrical multilayer component. In the embodiment illustrated according to FIG. 4a, a first internal electrode 7 and a second internal electrode 8 are arranged in different layers of the base body 1 and partly overlap one another. The electrical multilayer component has two third internal electrodes 9, which are arranged in different layers of the multilayer component and, as shown in FIG. 4c, completely overlap one another. The third internal electrodes 9 are spaced apart from the first 7 and the second 8 internal electrode by means of a second distance b. The electrical multilayer component has two fourth internal electrodes 10, which, analogously to the third internal electrodes 9, are arranged in different layers of the electrical multilayer component and completely overlap one another. The fourth internal electrodes 10 are spaced apart from the first internal electrode 7 and the second internal electrode 8 respectively by means of a third distance c.

FIG. 4b shows a section through the component along the sectional axis A, A'. The first 7 and the second 8 internal electrode are arranged in different layers of the base body 1, wherein there is a first vertical distance a between them.

FIG. 4c shows a section through the component along the sectional axis B, B'. In the embodiment illustrated, the electrical multilayer component has two electrode layers, wherein each of the electrode layers has a first 7 or a second 8 electrode and in each case a third 9 and a fourth 10 internal electrode. The third internal electrodes 9 are spaced apart from the first internal electrode 7 and the second internal electrode 8 laterally by means of the distance b. The fourth internal electrodes 10 are spaced apart from a first internal electrode 7 and a second internal electrode 8, respectively, laterally by means of the distance c.

FIG. 5a shows a schematic construction of the internal electrode in a further embodiment of the electrical multilayer component. In contrast to FIG. 4a, the electrical multilayer component according to FIG. 5a has no fourth internal electrodes 10 and only one third internal electrode 9. The first 7 and the second 8 internal electrode are arranged in different layers of the base body 1 and at least partly overlap one another.

FIG. 5b shows a section through the component along the sectional axis B, B'. In the embodiment illustrated, the multilayer component has a third internal electrode 9 arranged together with the second internal electrode 8 in an electrode layer of the base body 1. The first internal electrode 7 at least partly overlaps the second internal electrode 8 in a spaced-apart electrode layer.

FIG. 6a shows a schematic construction of the internal electrodes in a further embodiment of the electrical multilayer component, wherein the multilayer component has a base body 1 with a first 7 and a second 8 internal electrode, wherein the first 7 and the second 8 internal electrodes at least partly overlap. The electrical multilayer component has a third internal electrode 9 and a fourth internal electrode 10. The third 9 and the fourth 10 internal electrodes are arranged in the same electrode layer as the second internal electrode 8.

FIG. 6*b* illustrates a section through the component along the sectional axis B, B'. The second internal electrode 8 is arranged between a third 9 and a fourth internal electrode 10, wherein the second internal electrode 8 is laterally spaced apart from the third 9 and the fourth 10 internal electrode. The second internal electrode 8 overlaps the first internal electrode 7 and is spaced apart vertically from the latter.

FIG. 7*a* schematically shows a construction of the internal electrode in a further embodiment of the electrical multilayer component. In the embodiment illustrated, the base body 1 of the electrical multilayer component has two first internal electrodes 7, 7' and two second internal electrodes 8, 8'. A respective first internal electrode 7, 7' is arranged with a second internal electrode 8, 8' in the same layer and overlaps one of the further second internal electrodes 8, 8'. In the embodiment illustrated, the electrical multilayer component has two third internal electrodes 9 and two fourth internal electrodes 10, which are spaced apart from the first 7, 7' and second 8, 8' internal electrodes of the electrical multilayer component.

FIG. 7*b* shows a section through the component along the sectional axis A, A'. The first internal electrodes 7, 7' form with the second internal electrode 8, 8' arranged in the same layer an electrical functional unit of the multilayer component. The second internal electrodes 8, 8' overlapping one another can be arranged at a larger distance from one another than would have to be provided for a further electrical functional unit formed, if appropriate, by the second internal electrodes 8, 8'.

FIG. 7*c* shows a section through the component along the sectional axis B, B'. The two second internal electrodes 8, 8' overlap one another, wherein each of the second internal electrodes 8, 8' with one of the third 9 and one of the fourth 10 internal electrodes are arranged in the same layer of the base body 1 and is spaced apart laterally from them.

FIG. 8*a* shows the schematic construction of the internal electrodes in a further embodiment of the electrical multilayer component. A first 7 and a second 8 internal electrode are arranged in the same electrode layer of the base body 1 and spaced apart laterally from one another. The multilayer component has a third internal electrode 9, which extends from a side surface of the base body 1 and overlaps the second internal electrode 8. The second internal electrode 8 and the third internal electrode 9 are arranged in different electrode layers of the electrical multilayer component.

FIG. 8*b* shows a section through the component along the sectional axis A, A'.

FIG. 9*a* shows a schematic construction of the internal electrodes of a further embodiment of the electrical multilayer component. In comparison with the embodiment in FIG. 8*a*, the electrical multilayer component in FIG. 9*a* has an additional fourth internal electrode 10. The fourth internal electrode 10 overlaps the second internal electrode 8 and also the third internal electrode 9. The third 9 and fourth 10 internal electrode extend from opposite side surfaces of the electrical multilayer component and are arranged in different electrode layers.

FIG. 9*b* shows a section through the component along the sectional axis A, A'. The first 7 and the second 8 internal electrode are arranged in the same electrode layer of the base body 1. In the embodiment illustrated, the first 7 and the second 8 internal electrode are arranged in the vertical thickness direction of the electrical multilayer component between the third 9 and the fourth 10 internal electrode.

FIG. 10*a* schematically shows the construction of the internal electrodes of a further embodiment of the electrical multilayer component. The electrical multilayer component has a construction of the internal electrodes 7, 8 which is similar to the embodiment of the electrical multilayer component as illustrated in FIG. 7. The electrical multilayer component according to FIG. 10*a* has in each case two first 7, 7' and two second 8, 8' internal electrodes, wherein one first 7, 7' and one second 8, 8' internal electrode are in each case arranged in the same electrode layer of the base body 1. FIG. 10*b* shows a section through the component along the sectional axis A, A'. The first internal electrodes 7, 7' are in each case arranged in a layer of the base body 1 with a second internal electrode 8, 8' and at least partly overlap a further second internal electrode 8 in a further layer of the base body 1. The second internal electrodes 8, 8' at least partly overlap one another. The second internal electrodes 8, 8' in each case overlap a third 9 and a fourth 10 internal electrode of the electrical multilayer component. The third 9 and the fourth 10 internal electrode are arranged in different layers of the base body 1 and are arranged between the layers of the two second internal electrodes 8, 8' in the embodiment illustrated.

FIG. 11*a* schematically shows the construction of the internal electrodes of a further embodiment of the electrical multilayer component, wherein the construction of the electrical multilayer component in FIG. 11*a* is similar to the construction of the electrical multilayer component according to the embodiment in FIG. 10*a*. However, the third 9 and the fourth 10 internal electrode of the electrical multilayer component according to FIG. 10*a* are arranged in the same electrode layer of the base body 1.

FIG. 11*b* shows a section through the component along the sectional axis A, A'. A respective first internal electrode 7, 7' is arranged together with a second internal electrode 8, 8' in an electrode layer of the base body 1, wherein each of the first internal electrodes 7, 7' respectively overlaps a further second internal electrode 8, 8' in a further electrode layer. A third 9 and a fourth 10 internal electrode are arranged between the first 7, 7' and second 8, 8' internal electrodes and in each case partly overlap the second internal electrodes 8, 8'. The third 9 and the fourth 10 internal electrode are arranged in the same electrode layer and spaced apart from one another.

FIG. 12 schematically shows the arrangement of external electrodes 6, 6' at a base body 1 of an electrical multilayer component. The electrical multilayer component has six external electrodes 6, 6', wherein two external electrodes 6 are arranged at the end sides 4, 4' of the base body 1. In each case two further external electrodes 6' are arranged at two opposite side surfaces 5, 5' of the base body 1. The embodiments of the electrical multilayer component according to FIGS. 13 to 24 preferably have an arrangement of the external electrodes according to FIG. 12. Depending on the embodiment of the internal electrode arrangement, it is possible for individual external electrodes not to be contact-connected and to be present as dummy contacts.

FIG. 13 shows a schematic construction of the internal electrodes of a further embodiment of an electrical multilayer component. The electrical multilayer component has a first 7 and a second 8 internal electrode, which are arranged in the same electrode layer of the base body 1 and are spaced apart from one another laterally. Two third internal electrodes 9, 9' are arranged in the same electrode layer as the first 7 and the second 8 internal electrode, third internal electrodes 9, 9' extending from a side surface of the base body 1 and being spaced apart from the second internal electrode 8 laterally. The plan view of a section through the electrode layer along the sectional axis A-A' corresponds to FIG. 2b, and the section along the sectional axis B-B' corresponds to FIG. 2c.

FIG. 14 schematically shows the construction of the internal electrodes of a further exemplary embodiment of the electrical multilayer component. The electrical multilayer component has two fourth internal electrodes 10, 10', which are arranged in the same electrode layer as the first 7 and the second 8 internal electrodes and also the third internal electrodes 9, 9'. The fourth internal electrodes 10, 10' are spaced apart from the second internal electrode 8. A section through the component along the sectional axis A-A' corresponds to FIG. 2b, and a section along the sectional axis B-B' corresponds to FIG. 3b.

FIG. 15a schematically shows the construction of the internal electrodes of a further embodiment of the electrical multilayer component. The electrical multilayer component has a base body 1 with two first 7, 7' and two second 8, 8' internal electrodes. In each case four third 9, 9' and four fourth 10, 10' internal electrodes extend from the side surfaces of the base body 1. In each case one first 7, one second 8', one third 9 and one fourth 10 internal electrode are arranged in the same layer.

FIG. 15b shows a section through the component along the sectional axis A, A'. The electrical multilayer component has two first internal electrodes 7, 7', which are respectively arranged in a layer with a second internal electrode 8, 8'. The first internal electrodes 7, 7' respectively overlap a further second internal electrode 8, 8' in a further electrode layer of the base body 1. The first internal electrodes 7, 7' form with the second internal electrode 8, 8' arranged in the same layer an electrical functional unit of the multilayer component. The second internal electrodes 8, 8' overlapping one another can be arranged at a greater distance from one another than would have to be provided for a further electrical functional unit formed, if appropriate, by the second internal electrodes 8, 8'.

FIG. 15c shows a section through the component along the sectional axis B, B'.

FIG. 16a shows the schematic construction of the internal electrode of a further embodiment of the electrical multilayer component. The first 7 and the second 8 internal electrode are arranged in different layers of the base body 1 and at least partly overlap one another. The electrical multilayer component has two third internal electrodes 9, 9', which extend from a side surface of the base body 1 and are arranged in the same electrode layer as the second internal electrode 8. The two third internal electrodes 9, 9' are laterally spaced apart in each case from one another and from the second internal electrode 8.

FIG. 16b shows a section through the component along the sectional axis A, A' which corresponds to FIG. 4b.

FIG. 17 shows a further embodiment of the electrical multilayer component with a schematic construction of the internal electrodes, wherein the construction of the internal electrodes is similar to the embodiment of the electrical multilayer component according to FIG. 16a. However, the electrical multilayer component according to FIG. 17 additionally has two fourth internal electrodes 10, 10', which extend from the side of the base body 1 which lies opposite the side with the third internal electrodes 9, 9'. The fourth internal electrodes 10, 10' are arranged in the same electrode layer as the second 8 and the third internal electrodes 9, 9'. The two fourth internal electrodes 10, 10' are spaced apart in each case from one another and from the second internal electrode 8. A section through the component along the sectional axis A, A' corresponds to FIG. 4b, and a section along the sectional axis B, B' corresponds to FIG. 6b.

FIG. 18 shows a schematic construction of the internal electrodes of a further exemplary embodiment of the electrical multilayer component. The base body 1 of the electrical multilayer component has first 7 and second 8 internal electrodes, which are arranged in different electrode layers of the base body 1 and at least partly overlap one another. The base body 1 of the electrical multilayer component has two third internal electrodes 9, 9' spaced apart from one another and also fourth internal electrodes 10, 10'. A section through the component along the sectional axis A, A' corresponds to FIG. 4b, and a section along the sectional axis B, B' corresponds to FIG. 4c.

FIG. 19a schematically shows the construction of the internal electrodes of a further embodiment of the electrical multilayer component. The base body 1 of the electrical multilayer component has a first 7 and a second 8 internal electrode, which are arranged in the same layer of the base body 1 and are spaced apart from one another. The electrical multilayer component has two third internal electrodes 9, 9', which are arranged in a further electrode layer of the base body 1. The third internal electrodes 9, 9' are in each case spaced apart from one another and at least partly overlap the second internal electrode 8.

FIG. 19b shows a section through the component along the sectional axis A, A'.

FIG. 20a shows a schematic construction of the internal electrodes of a further exemplary embodiment of the electrical multilayer component. The construction of the electrical multilayer component is similar to the embodiment according to FIG. 19a, wherein the electrical multilayer component in FIG. 20a additionally has two fourth internal electrodes 10, 10', which are arranged in a further electrode layer of the base body 1 and at least partly overlap the second internal electrode 8.

FIG. 20b shows a section through the component along the sectional axis A, A'. In contrast to the embodiment according to FIG. 19b, two fourth internal electrodes 10, 10' are arranged in a further layer of the base body 1, the fourth internal electrodes being spaced apart from one another and at least partly overlapping the second internal electrode 8. The second internal electrode 8 is arranged in a layer of the base body 1 which is situated between the layer of the third 9, 9' internal electrodes and the layer of the fourth 10, 10' internal electrodes.

FIG. 21a schematically shows the construction of the internal electrode of a further embodiment of the electrical multilayer component. The electrical multilayer component has a similar construction of the internal electrodes to the embodiment of the electrical multilayer component according to FIG. 18a. The electrical multilayer component according to FIG. 19a has in each case two first 7, 7' and two second 8, 8' internal electrodes, wherein a first 7 and 7' and second 8 and 8' internal electrode are respectively arranged in a common electrode layer.

FIG. 21b shows a section through the component along the sectional axis A, A'. The base body 1 of the electrical multilayer component has two first internal electrodes 7, 7', which extend from the opposite sides of the base body 1 and are arranged in each case with a second internal electrode 8, 8' in the same electrode layer and are spaced apart from them. The first internal electrodes 7, 7' at least partly overlap one of the second internal electrodes 8, 8' in a further layer of the base body 1. Two layers are arranged between the first 7, 7' and the second 8, 8' internal electrodes, wherein each of the layers respectively comprises two internal electrodes which are spaced apart from one another and which at least partly overlap the second 8, 8' internal electrodes. Two third electrodes 9, 9' spaced apart from one another are arranged in one layer. Two fourth internal electrodes 10, 10' spaced apart from one another are arranged in the further layer.

FIG. 22*a* schematically shows the construction of the internal electrodes in a further embodiment of the electrical multilayer component, wherein the construction of the internal electrodes in plan view is similar to the construction according to the embodiment according to FIG. 19*a*. In contrast to the embodiment according to FIG. 21*a*, however, the third 9, 9' and the fourth 10, 10' internal electrodes are arranged in the same layer of the base body 1, as illustrated in FIG. 22*b*.

FIG. 23 shows a cross section through an electrical multilayer component. The construction of the internal electrodes is similar to the construction of the internal electrodes that is illustrated in FIG. 19*b*. The electrical multilayer component in FIG. 23 is terminated in the thickness direction by two dielectric layers 18, 18'.

FIG. 24 shows a cross section through an electrical multilayer component, wherein the construction of the internal electrodes is similar to the construction of the internal electrodes in the embodiment of the electrical multilayer component in FIG. 21*b*. A dielectric layer 18'' is arranged between the layer having the third internal electrodes 9, 9' and the layer having the fourth internal electrodes 10, 10'. In the thickness direction, the base body 1 of the electrical multilayer component is in each case terminated by a dielectric layer 18, 18'.

FIG. 25 shows a schematic circuit arrangement of an electrical multilayer component having five electrical functional units in the embodiment illustrated. The electrical functional units are embodied as varistors 14 in the embodiment illustrated. However, it is also possible for the electrical functional units to be embodied as capacitors. Furthermore, the multilayer component can have both capacitors and varistors. In the embodiment illustrated, the electrical multilayer component has six external electrodes 6, 6', wherein two external electrodes 6 are arranged at the end sides of the electrical multilayer component and in each case two external electrodes 6' are arranged at the side surfaces of the electrical multilayer component. An external electrode 6 of the electrical multilayer component which is arranged at the end side is connected to ground GND. A further external electrode 6 arranged at the end side is connected to a voltage-carrying line 15. The external electrodes 6' arranged at the side surfaces of the multilayer component are preferably connected to signal-carrying lines. The order of the external electrodes 6' at the side surfaces can be chosen as desired.

FIG. 26 shows the arrangement of the external electrodes 6, 6' of an embodiment of the electrical multilayer component. The base body 1 of the electrical multilayer component has in each case two external electrodes 6 arranged at the end sides 4, 4'. The external electrodes 6 arranged at the end sides 4, 4' are respectively connected to a first and a second internal electrode of the electrical multilayer component. The external electrodes 6' arranged at the side surfaces 5, 5' of the base body 1 are respectively connected to third and fourth internal electrodes. The electrical multilayer component preferably has a symmetrical construction.

FIG. 27*a* shows the arrangement of the external electrodes of an embodiment of the electrical multilayer component from the underside of the base body 1. The base body 1 has in each case three external electrodes 6, 6' at the end sides 4, 4'. There are arranged on the underside of the base body 1 three rows each comprising four external electrodes, which are embodied as rectangular contact areas 19, 19' in the embodiment illustrated. The contact areas 19, 19' together form a land grid array (LGA) on the underside of the base body 1.

FIG. 27*b* shows a section through the component along the sectional axis A, A'. The section through the electrical multilayer component shows a first 7 and a second 8 internal electrode, which extend from opposite end sides of the base body 1. The first 7 and second 8 internal electrode are arranged in the same layer and spaced apart laterally from one another. For each pair of first 7 and second 8 internal electrodes, four third internal electrodes 9 extend from the underside of the base body 1. The third internal electrodes 9 and the first 7 and the second 8 internal electrode are arranged in the same electrode layer and are spaced apart laterally from these. The electrode layers of the component are arranged perpendicularly to the underside of the base body 1 and extend along the sectional axis A, A'.

FIG. 28*a* shows the arrangement of the external electrodes of an electrical multilayer component on the underside of the base body 1. In the embodiment illustrated, the external electrodes of the electrical multilayer component are embodied as a ball grid array (BGA). The individual round, or oval contact areas 19, 19' are respectively arranged in three rows of six contact areas 19, 19'.

FIG. 28*b* shows a section through the component along the sectional axis A, A'. The base body 1 has a first 21 and a second 22 internal electrode in an L-shape, which are spaced apart laterally from one another. The contact-connection of the first 21 and of the second 22 internal electrode is effected from the underside of the base body 1. In the view illustrated, four third internal electrodes 9 spaced apart from one another extend from the underside of the base body 1. The first 21 and the second 22 internal electrode are arranged together with the third internal electrodes 9 in the same electrode layer of the electrical multilayer component. The electrode layers of the base body 1 are arranged perpendicularly to the underside of the multilayer component and extend along the sectional axis A, A'. The internal electrodes 9 are spaced apart laterally from the first 21 and second 22 internal electrode. The external electrodes are embodied in the form of round contact areas 19, 19', on which soldering beads 20, 20' are applied. In FIG. 28*b*, the contact areas 19 of the first 7 and second 8 internal electrode have a smaller diameter than the contact areas 19' of the third internal electrodes 9.

Figure 1:
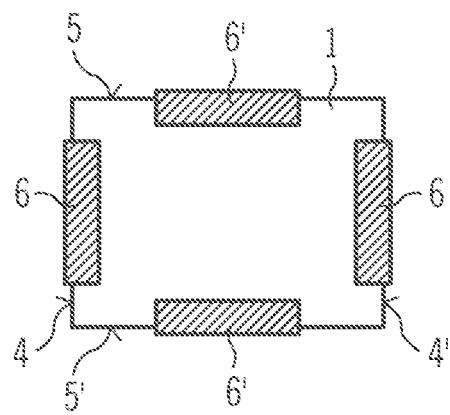
FIG. 1 shows the arrangement of external electrodes in one embodiment of the electrical multilayer component.
Figure 2C:
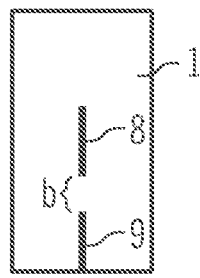
FIGS. 2a-2c show a first exemplary embodiment of an electrical multilayer component comprising three internal electrodes in different sectional illustrations.
Figure 2A:
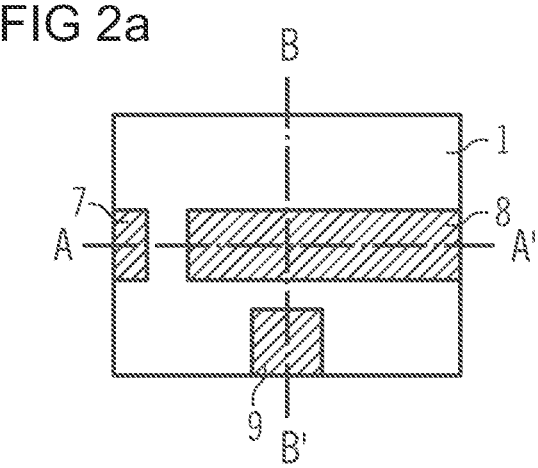
Figure 2B:
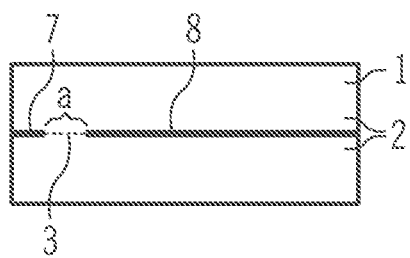
Figure 3B:
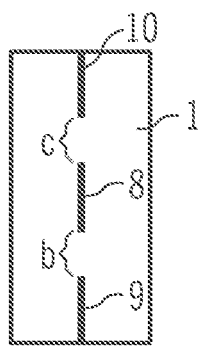
FIGS. 3a-3b show, in sectional illustrations, a further exemplary embodiment of an electrical multilayer component comprising four internal electrodes.
Figure 3A:
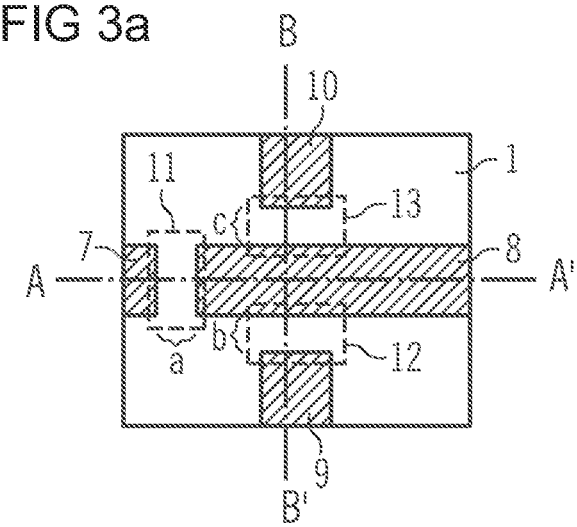
Figure 4C:
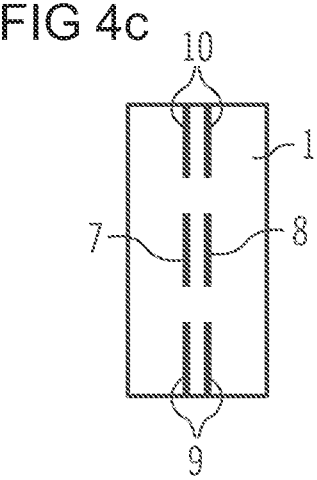
FIGS. 4a-4c show a further exemplary embodiment of an electrical multilayer component comprising three internal electrodes in different sectional illustrations.
Figure 4A:
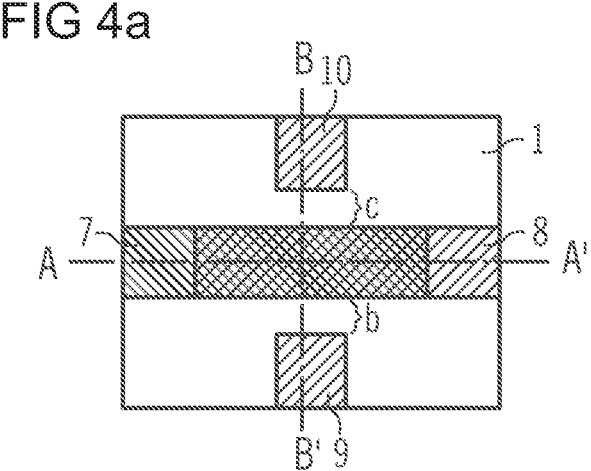
Figure 4B:
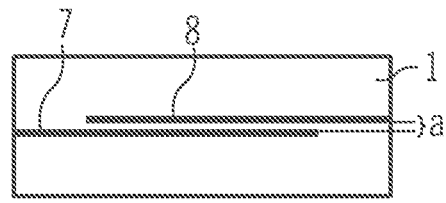
Figure 5B:
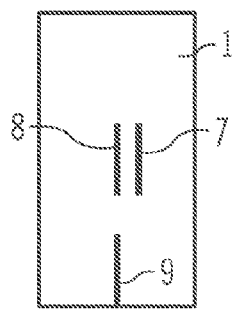
FIGS. 5a-5b show a further embodiment of the electrical multilayer component in different sectional illustrations.
Figure 5A:
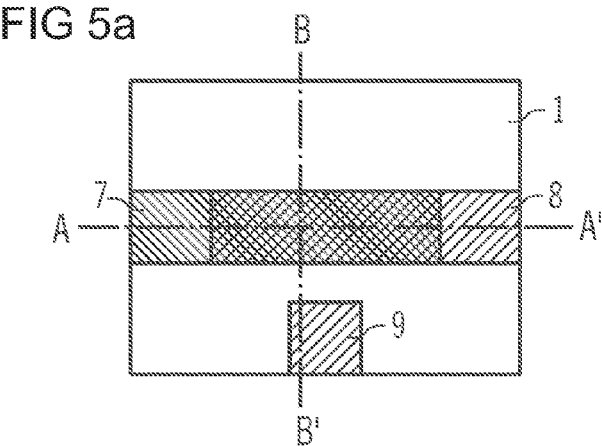
Figure 6B:
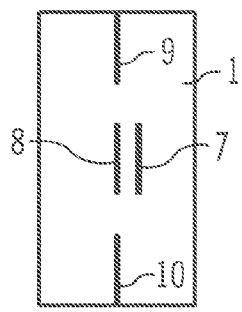
FIGS. 6a-6b, 7a-7c and 8a-8b show, in sectional illustrations, further exemplary embodiments of the electrical multilayer component comprising four internal electrodes.
Figure 6A:
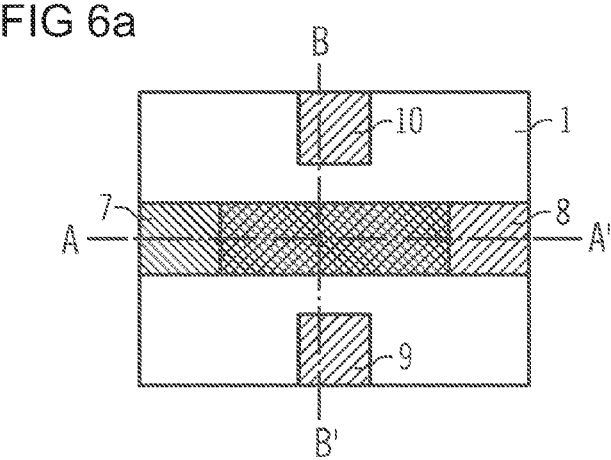
Figure 7C:
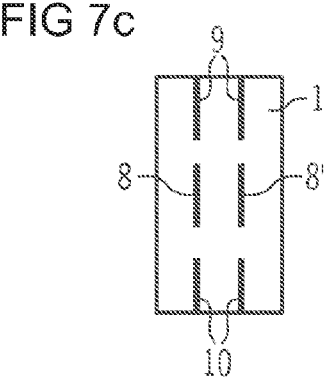
Figure 7A:
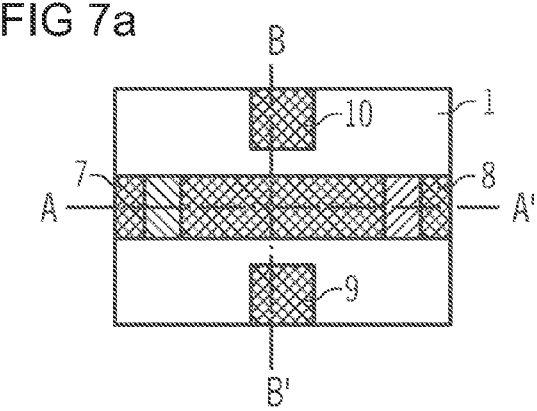
Figure 7B:
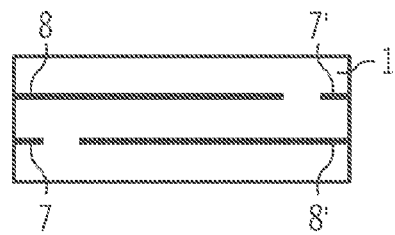
Figure 8A:
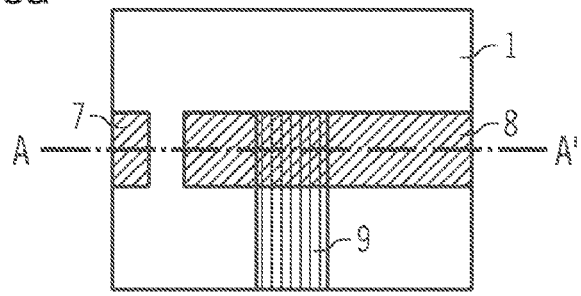
Figure 8B:
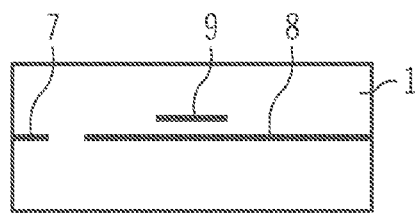
Figure 9A:
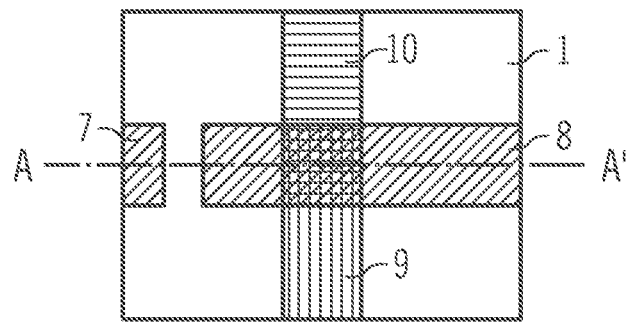
FIGS. 9a-9b and 10a-10b show further embodiments of the electrical multilayer component in different sectional illustrations.
Figure 9B:
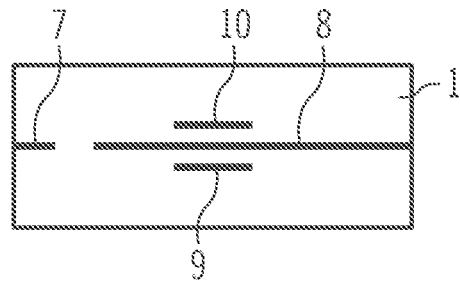
Figure 10A:
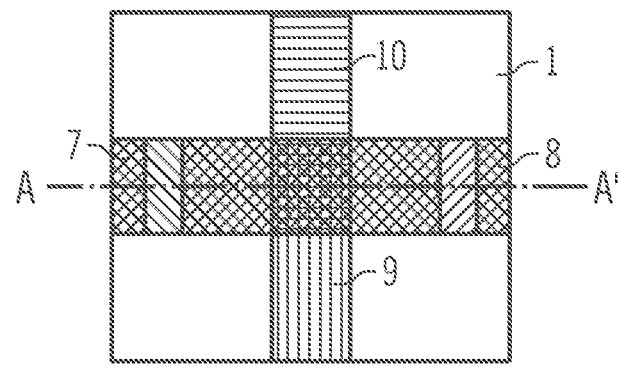
Figure 10B:
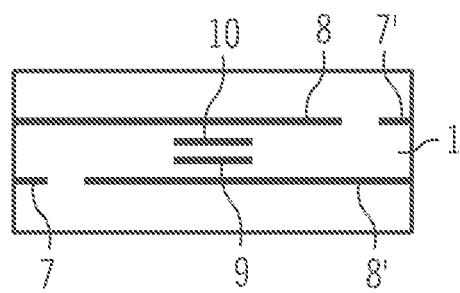
Figure 11A:
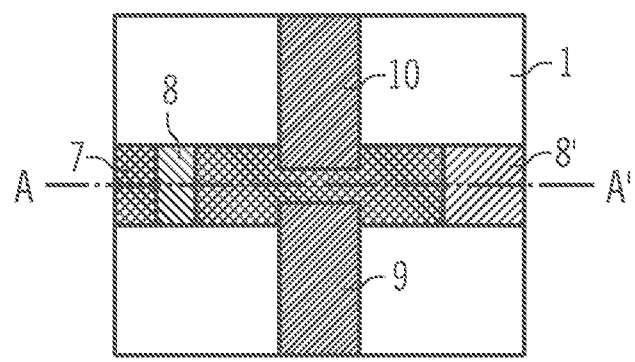
FIGS. 11a-11b show the arrangement of external electrodes of one embodiment of an electrical multilayer component.
Figure 11B:
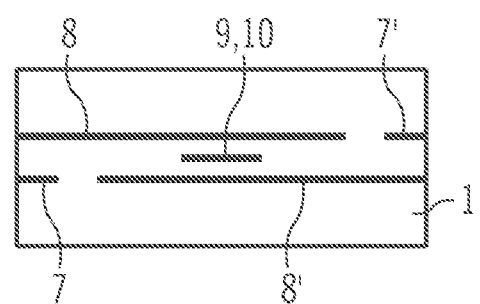
Figure 12:
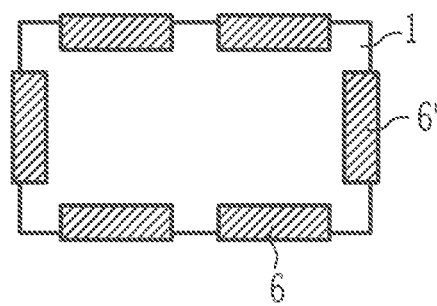
FIG. 12 shows a further embodiment of the electrical multilayer component in different sectional illustrations.
Figure 13:
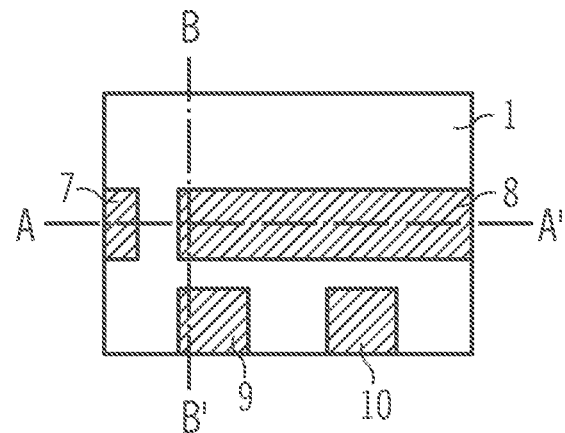
FIG. 13 shows a schematic construction of the internal electrodes of a further exemplary embodiment of an electrical multilayer component.
Figure 14:
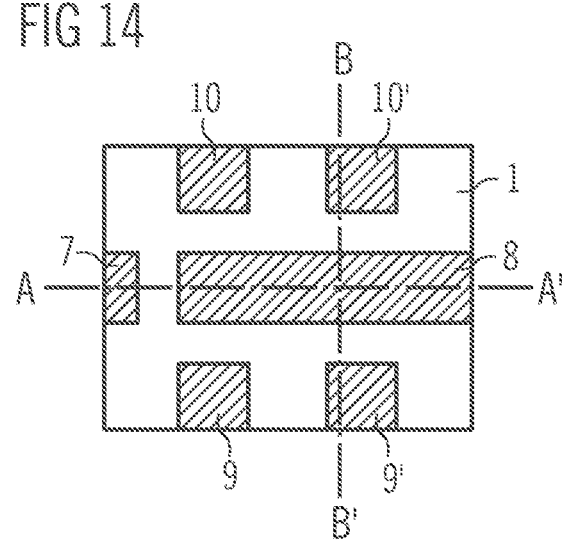
FIG. 14 schematically shows the construction of the internal electrodes of a further exemplary embodiment of the electrical multilayer component.
Figure 15C:
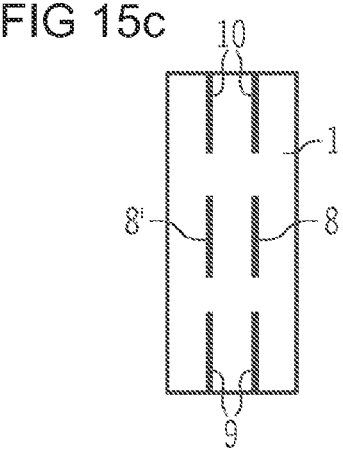
FIGS. 15a-15c and 16a-16b show further embodiments of the electrical multilayer component in different sectional illustrations.
Figure 15A:
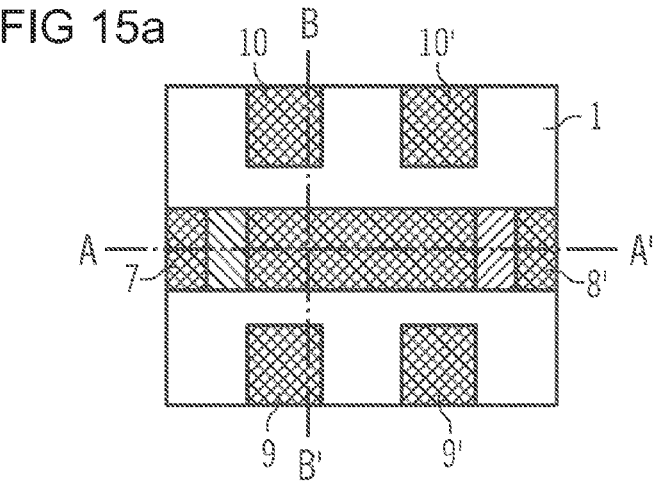
Figure 15B:
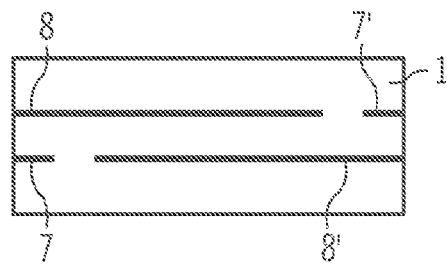
Figure 16A:
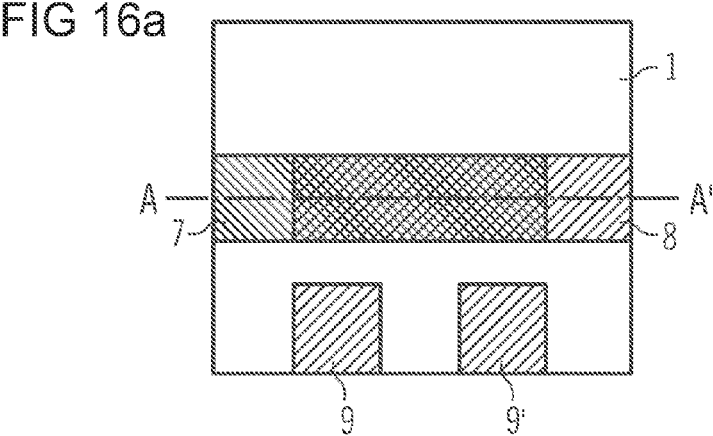
Figure 16B:
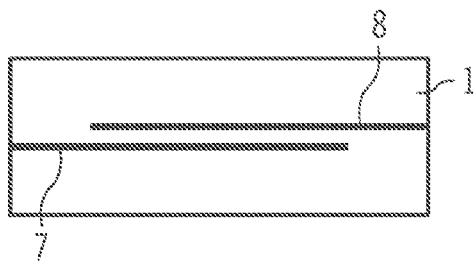
Figure 17:
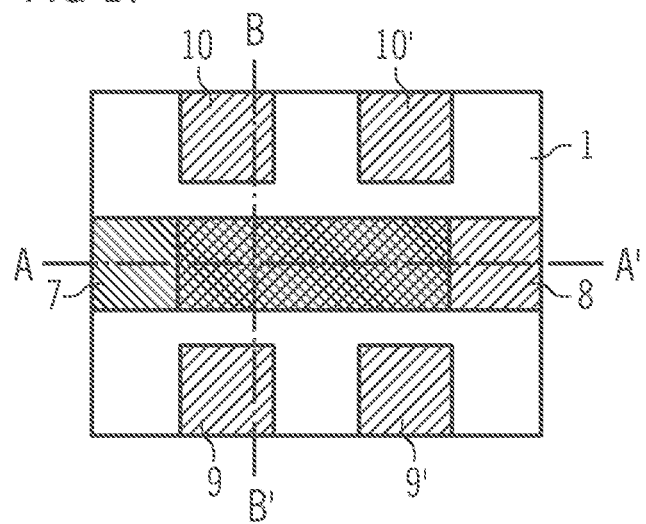
FIGS. 17 and 18 schematically show the construction of the internal electrodes of further exemplary embodiments of the multilayer component comprising a plurality of internal electrodes.
Figure 18:
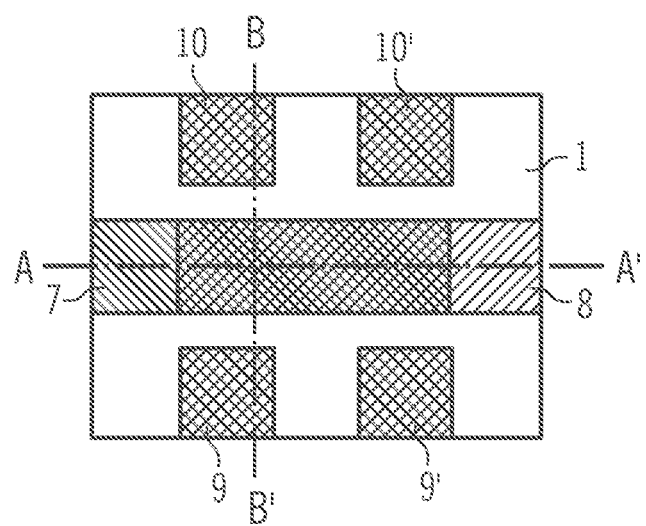
Figure 19A:
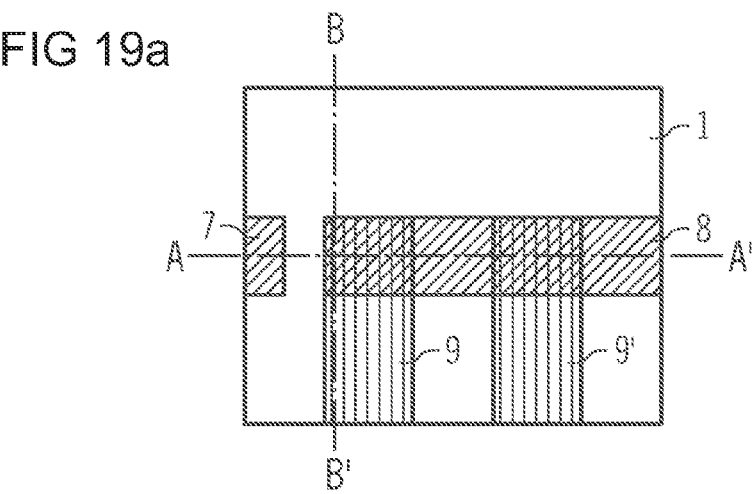
FIGS. 19a-19b, 20a-20b, 21a-21b and 22a-22b show further embodiments of the electrical multilayer component in different sectional illustrations.
Figure 19B:
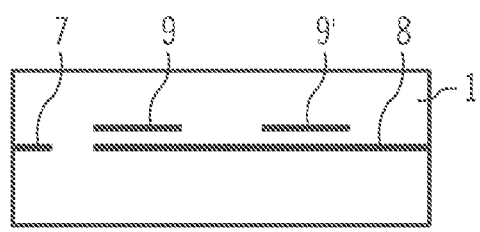
Figure 20A:
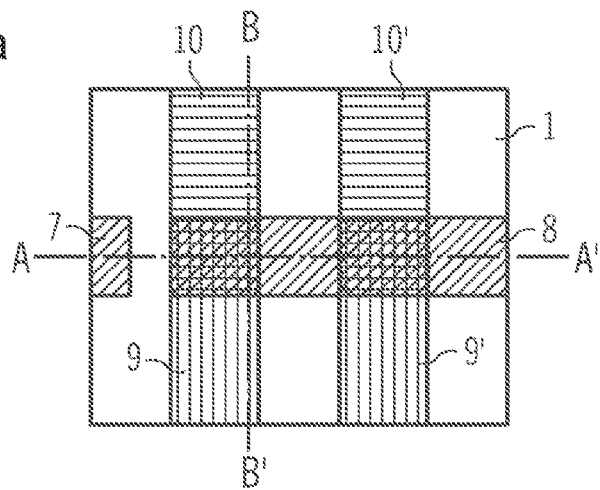
Figure 20B:
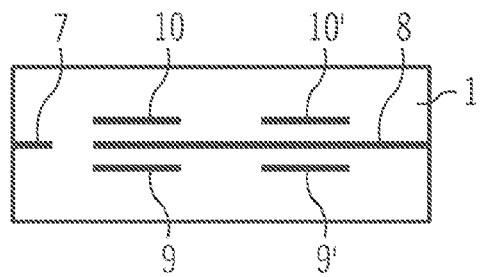
Figure 21A:
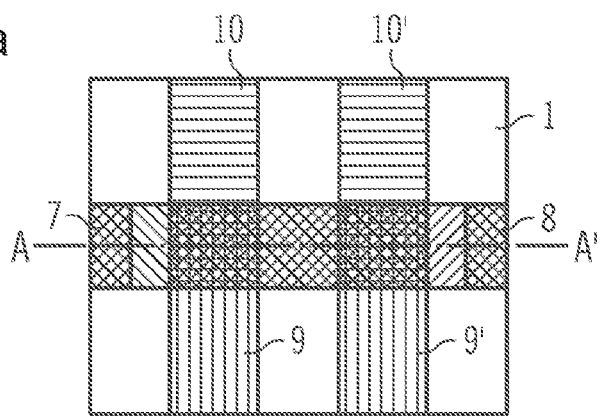
Figure 21B:
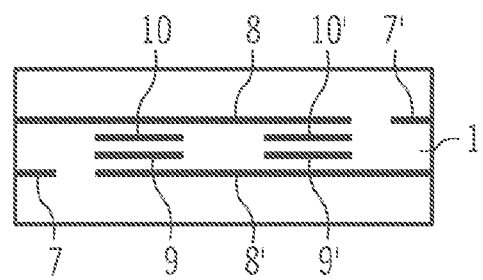
Figure 22A:
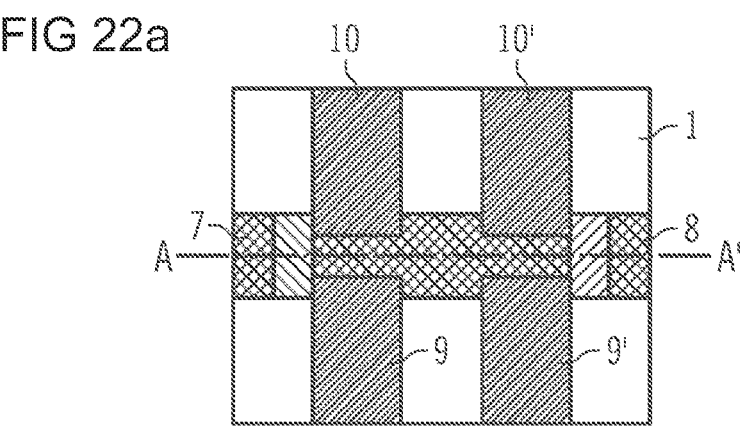
Figure 22B:
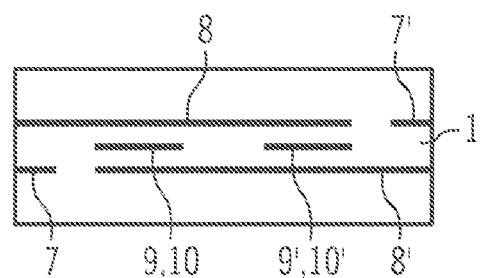
Figure 23:
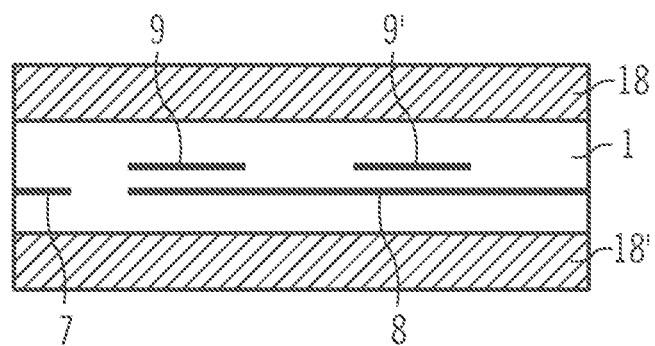
FIG. 23 shows a cross section through an electrical multilayer component, wherein the multilayer component is demarcated in the thickness direction by a respective dielectric layer.
Figure 24:
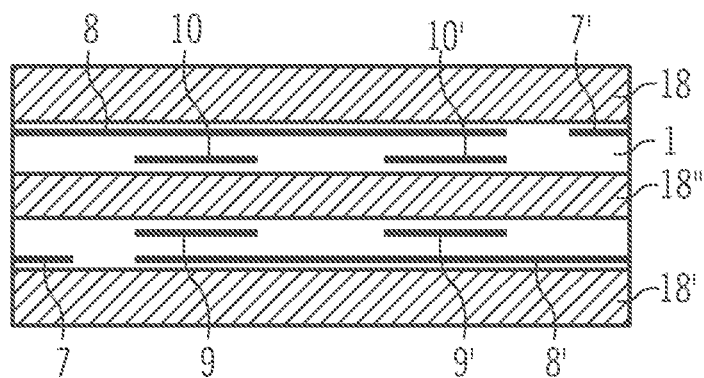
FIG. 24 shows a cross section through an embodiment of an electrical multilayer component, having a plurality of dielectric layers.
Figure 25:
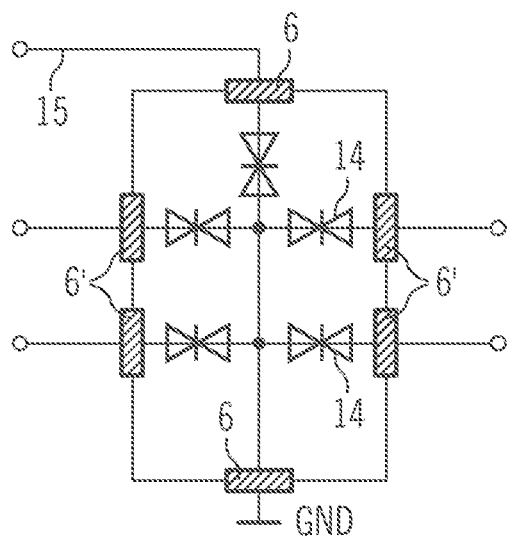
FIG. 25 shows a circuit arrangement of an exemplary embodiment of the electrical multilayer component comprising a plurality of electrical functional units.
Figure 26:
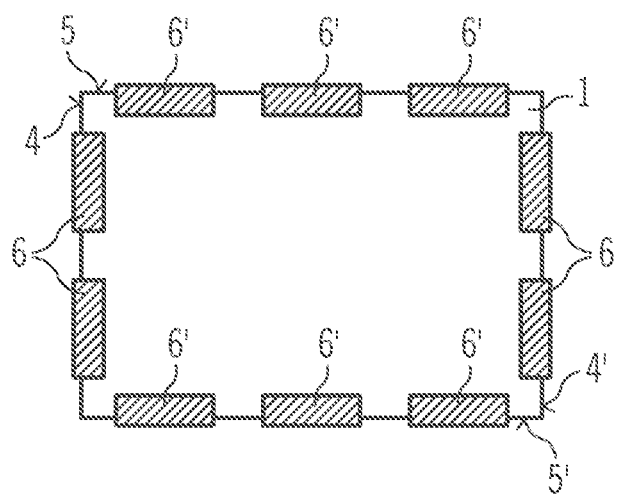
FIG. 26 shows the arrangement of the external electrodes in accordance with a connection area of a multilayer component, wherein a plurality of external electrodes are arranged at the end sides.
Figure 27A:
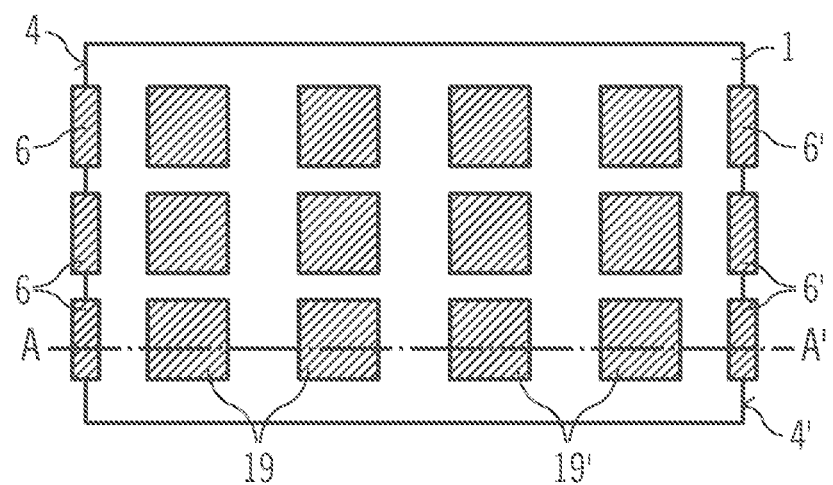
FIGS. 27a-27b and 28a-28b show further embodiments of the electrical multilayer components in different sectional illustrations.
Figure 27B:
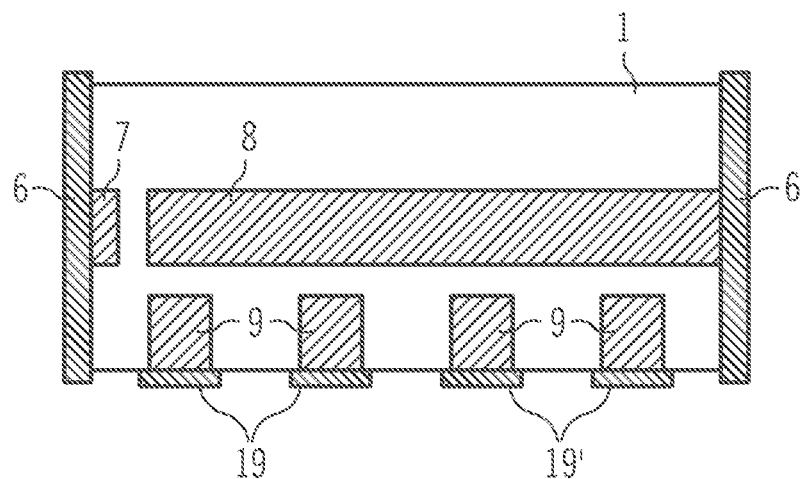
Figure 28A:
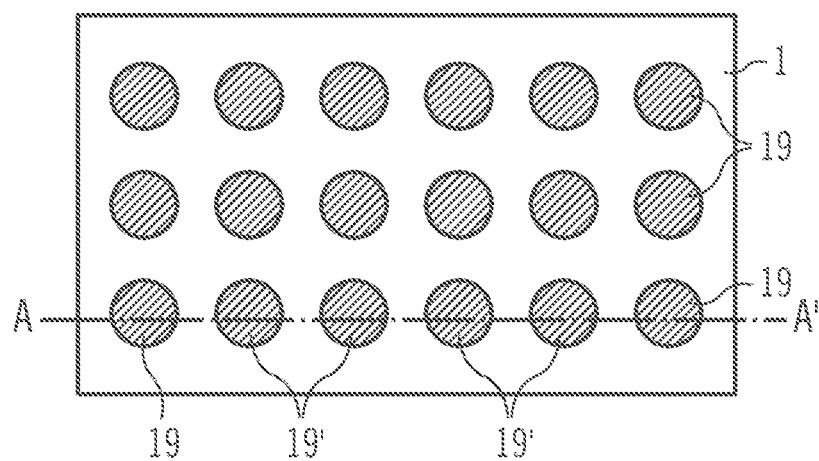
Figure 28B:
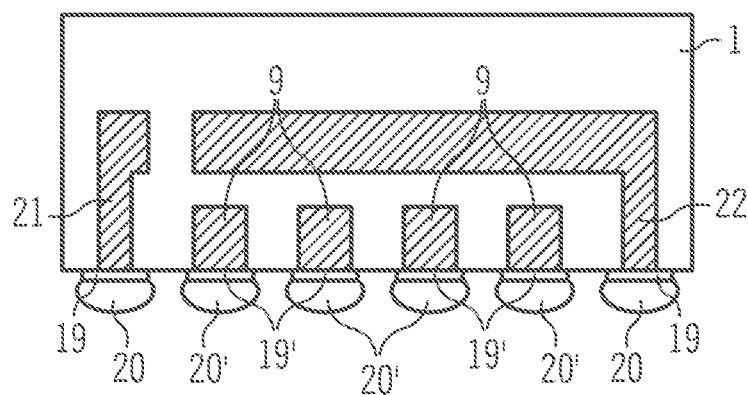

Although only a restricted number of possible developments of the inventions could be described in the exemplary embodiments, the invention is not restricted thereto. It is possible, in principle, for the electrical multilayer component to have a multiplicity of electrical functional units which are embodied as varistors or as capacitors, wherein the arrangement of the functional units, of the internal electrodes and of the external electrodes is preferably embodied symmetrically. A limit is imposed on the number of electrical functional units only by the size of the multilayer component.

The invention claimed is:

1. An electrical multilayer component, comprising:
   a monolithic base body comprising a plurality of ceramic layers and at least one electrode layer arranged alternately one above another, wherein the base body has two end surfaces lying opposite one another and two side surfaces lying opposite one another,
   a plurality of external electrodes; and
   at least three internal electrodes, wherein each internal electrode is assigned a respective external electrode, wherein a first internal electrode protruding from an end surface and a second internal electrode protruding from an opposite end surface are at a first distance from one another, and wherein a third internal electrode protrudes from a side surface, the third internal electrode being at a second distance from the first or second internal electrode.

2. The multilayer component according to claim 1, wherein the first internal electrode and the second internal electrode overlap.

3. The multilayer component according to claim 1, wherein the third internal electrode overlaps the first internal electrode or the second internal electrode.

4. The multilayer component according to claim 1, wherein the first internal electrode has a larger electrode area than the second internal electrode.

5. The multilayer component according to claim 1, wherein the first internal electrode and the second internal electrode are separated by at least one of the ceramic layers, the first and second internal electrodes delimiting a first electrical functional unit.

6. The multilayer component according to claim 5, wherein the third internal electrode in a boundary region with one of the first internal electrode or the second internal electrode together with the ceramic layer lying therebetween forms a second electrical functional unit.

7. The multilayer component according to claim 6, wherein a fourth internal electrode protruding from a side surface is spaced apart from the first internal electrode or the second internal electrode by a third distance and delimits a third electrical functional unit.

8. The multilayer component according to claim 5, wherein the first electrical functional unit functions as a capacitor.

9. The multilayer component according to claim 8, wherein the multilayer component has a plurality of capacitors having different capacitances.

10. The multilayer component according to claim 5, wherein the first electrical functional unit functions as a varistor.

11. The multilayer component according to claim 10, wherein the multilayer component has a plurality of varistors having different varistor voltages.

12. The multilayer component according to claim 1, wherein the third internal electrode in a boundary region with one of the first internal electrode or the second internal electrode together with a ceramic layer lying therebetween forms an electrical functional unit.

13. The multilayer component according to claim 1, further comprising a fourth internal electrode protruding from a side surface, the fourth internal electrode being spaced apart from the first internal electrode or the second internal electrode by a third distance.

14. The multilayer component according to claim 1, further comprising a dielectric layer that has a low permittivity.

15. The multilayer component according to claim 14, wherein the dielectric layer comprises a glass, a $ZrO_2$, a glass/$ZrO_2$ composite, an $AlO_x$ or a glass/$AlO_x$ composite.

16. The multilayer component according to claim 1, wherein the ceramic layer comprises a varistor ceramic, wherein the varistor ceramic comprises ZnO-BiSb or ZnO-Pr.

17. The multilayer component according to claim 1, wherein the ceramic layer comprises a capacitor ceramic.

18. The multilayer component according to claim 1, wherein a region of the first distance, and a region of the second distance each comprise at least one ceramic layer.

19. The multilayer component according to claim 1, wherein one of the plurality of external electrodes is arranged on an end side and is connected to ground.

20. The multilayer component according to claim 19, wherein a second one of the plurality of external electrodes is arranged on an end side and is connected to a voltage-carrying line.

* * * * *